Feb. 10, 1942.  W. N. LUHMANN  2,272,569
FISH BOX FOR BOATS
Filed Aug. 7, 1941

Inventor
William N. Luhmann
By Williamson & Williamson
Attorneys

Patented Feb. 10, 1942

2,272,569

UNITED STATES PATENT OFFICE 2,272,569

FISH BOX FOR BOATS

William N. Luhmann, Minneapolis, Minn.

Application August 7, 1941, Serial No. 405,771

4 Claims. (Cl. 43—55)

This invention relates to live boxes and particularly to a live box adapted for quick attachment to a fishing boat and immersed in the water at the side of the boat to retain fish and bait in live condition.

Most live fish receptacles for boats heretofore used have offered considerable obstruction to rowing the boat or trolling and have thus been objectionable. A number of prior art devices have utilized a flexible net or bag with a frame or bracket mounted at one side of the boat. With such structure the fish are rubbed and thrown together, causing the protective oily film on their skins to be scraped off and usually causing the fish to die in a short time.

It is an object of my invention to provide a simple, comparatively inexpensive fish box which may be very readily attached to the gunwale of a boat and which makes provision for receiving the fish and holding them in a natural position in the water at the side of the boat.

A further object is the provision of a fish box of the class described wherein during rowing or trolling the box will automatically be shifted to ride the water and thus offer only a minimum resistance.

A further object is the provision of a device of the class described wherein the box may be utilized for carrying live bait as well as for a stationary live box attached to a dock or set into the water on shore.

These and other objects and advantages will be more apparent from the following description made in connection with the accompanying drawing, wherein like reference characters refer to the same parts throughout the several views, and in which.

Figure 1:
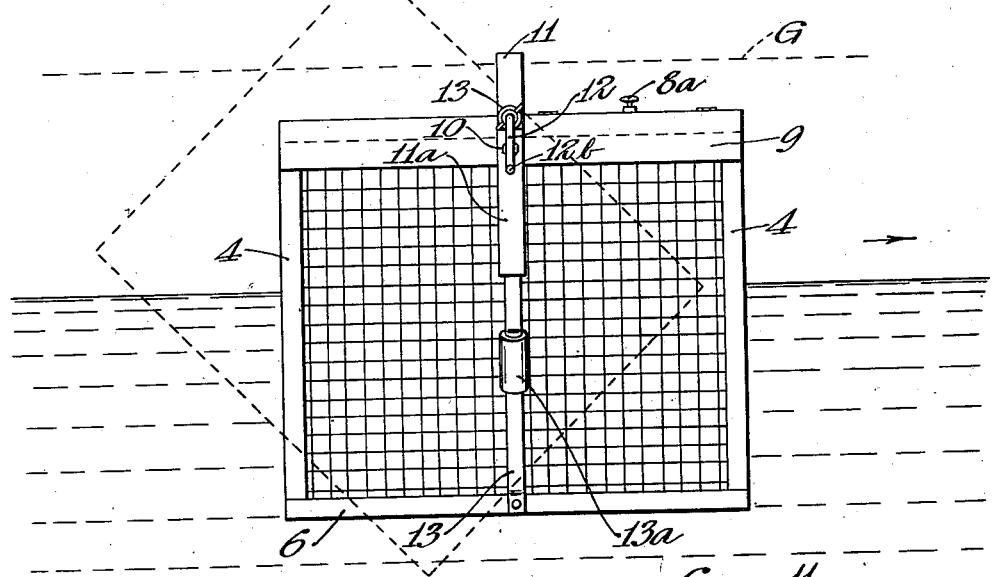
Figure 1 is a side elevation of an embodiment of the invention, showing the live box immersed in the water as it appears when attached to the left side of a small boat, the dotted lines indicating the tilted position the box assumes during the movement of the boat through the water.
Figure 2:
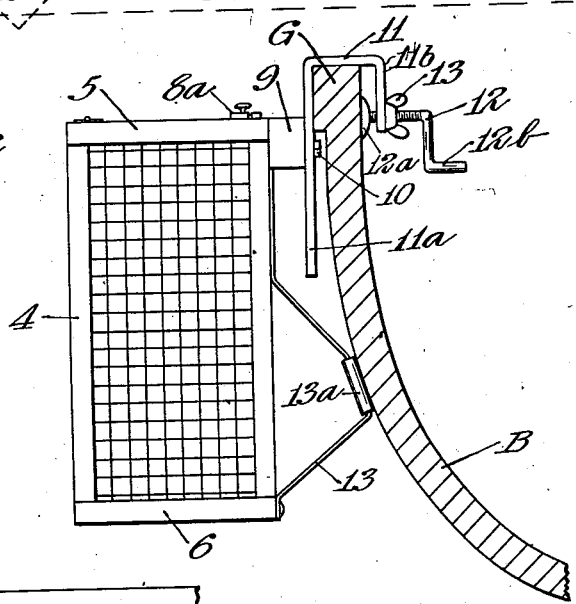
Figure 2 is a cross section taken through the rear portion of a rowboat having my live box attached to the left side thereof.
Figure 3:
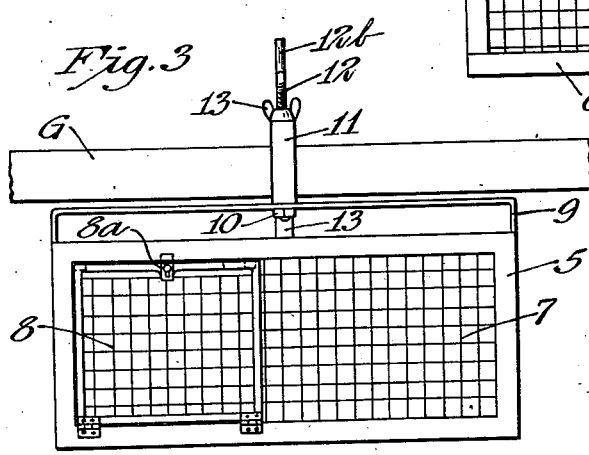
Figure 3 is a top plan view of the same.

In the form of the invention shown, a skeleton box-like frame is provided preferably constructed of relatively heavy gauge sheet metal and comprising upright frame members 4 spot-welded, soldered, or otherwise rigidly secured between the top and bottom rectangular frames 5 and 6, respectively. The frames and frame members may be conveniently constructed of angle iron or angularly bent sheet metal.

The box frame so formed is covered at its bottom, sides and ends with wire netting, rod netting or other reticulated material, as shown, the respective sheets of rod netting being secured to the inner sides of the frame members. At the top of the box a sheet of netting or reticulated material 7 is secured to the underside of the rectangular frame 5, covering most of the top but leaving a narrow doorway in the forward portion of the top. A hinged door 8, which may be conveniently constructed of rod netting, is mounted in said doorway completing the closure of the top of the box, and preferably being provided with a spring catch device 8a for releasably retaining the door in closed position.

On the rear side and at the upper portion thereof a re-enforcing and spacing bar 9 is provided which is secured to the frame 5 and, as shown, extends the full length thereof. This bar, as shown, is pivotally connected at its central portion by a heavy pivot pin 10 with the depending outer end 11a of a clamping bracket 11. Clamping bracket 11 is of general inverted U-shape form, having mounted in the depending inner leg 11b thereof a screw clamp 12 carrying at its outer end the clamping disc 12a which cooperates with the leg 11a of the bracket to securely clamp the device upon the gunwale G at the side of a boat. The clamping bolt 12 may be provided with a crank handle 12b to facilitate its operation, and a lock nut 13 may be associated with the bolt if desired.

To assist in the proper positioning of the box or fish receptacle and to prevent undue lateral strains on the pivot bolt 10, I provide a bumper 13 in the form of an angularly bent strap connected to corresponding longitudinal members of box frames 5 and 6 and having at its inner projecting portion a cushioning element 13a which may conveniently comprise a tubular piece of rubber adapted to engage against the hull of the boat B.

The pivotal joint formed between the bracket 11 and bar 9 through the medium of the pivot pin is loose so that the entire box may freely swing on a transverse, horizontal axis.

In use the box may be very conveniently carried in the trunk or body of a passenger vehicle and may contain live frogs or other bait for use in fishing. The live box may be readily mounted on the side of a fishing boat for use, as shown in the accompanying drawing, and when so mounted the greater portion of the box is submerged in the water. When a fish is caught the door 8 is readily opened and a fish tossed into the box. The fish in the box maintain themselves in normal position and are kept in excellent condition until the fishing is completed. When the boat is rowed, or during trolling, the movement of the boat over the water causes the box to automatically swing because of the rigid bottom into a tilted position, as illustrated in the dotted lines of Fig. 1, the box then gliding smoothly over the water and offering very little resistance to the travel of the boat, while, nevertheless, permitting the fish to maintain themselves in the water without being bunched together or rubbing against one another, as is the case with fish receptacles of bag or flexible construction. The importance of the tilting action of the box and gliding when the boat is used for trolling is important and valuable.

The box may be removed when the boat comes in and attached to a board or deposited on the bottom and used as a live box.

From the foregoing description it will be seen that I have invented a simple and practical fish box for boats which achieves novel and distinct advantages over fish receptacles now in use.

It will, of course, be understood that various changes may be made in the form, details, arrangements and proportions of the parts without departing from the scope of my invention.

What is claimed is:

1. A fish box for boats comprising, a box-like reticulated container, said container having a bottom constructed of relatively rigid material, a bracket adapted to be clamped to the gunwale of a boat, and a pivotal connection between said bracket and said box permissive of swinging action of said box on a horizontal axis disposed transversely of said gunwale, whereby in the movement of said boat over the water said container will be automatically tilted to offer minimum obstruction to the water.

2. A fish box for boats comprising, a reticulated box-like container having a relatively rigid bottom, a clamping bracket for securing said container to the outside of the gunwale of a boat, a pivotal connection between said bracket and the upper and central portion of said container adapted to permit said container to swing on a horizontal axis transversely of said gunwale, and bumper means extending inwardly from one side of said container for engaging the hull of the boat some distance below said point of attachment of said gunwale.

3. A fish box for boats comprising, a skeleton box frame of substantially rigid material, netting enclosing said frame, a door in the top of said box, a bracket adapted to be secured to the gunwale of a boat, and a horizontal pivotal connection between said bracket and said box for supporting said box and for permitting swinging action thereof on an axis disposed transversely of said gunwale.

4. The structure set forth in claim 3, and a member extending inwardly from the inner side of said box and secured thereto for engaging the hull of the boat some distance below said pivotal connection.

WILLIAM N. LUHMANN.